Figure 1:
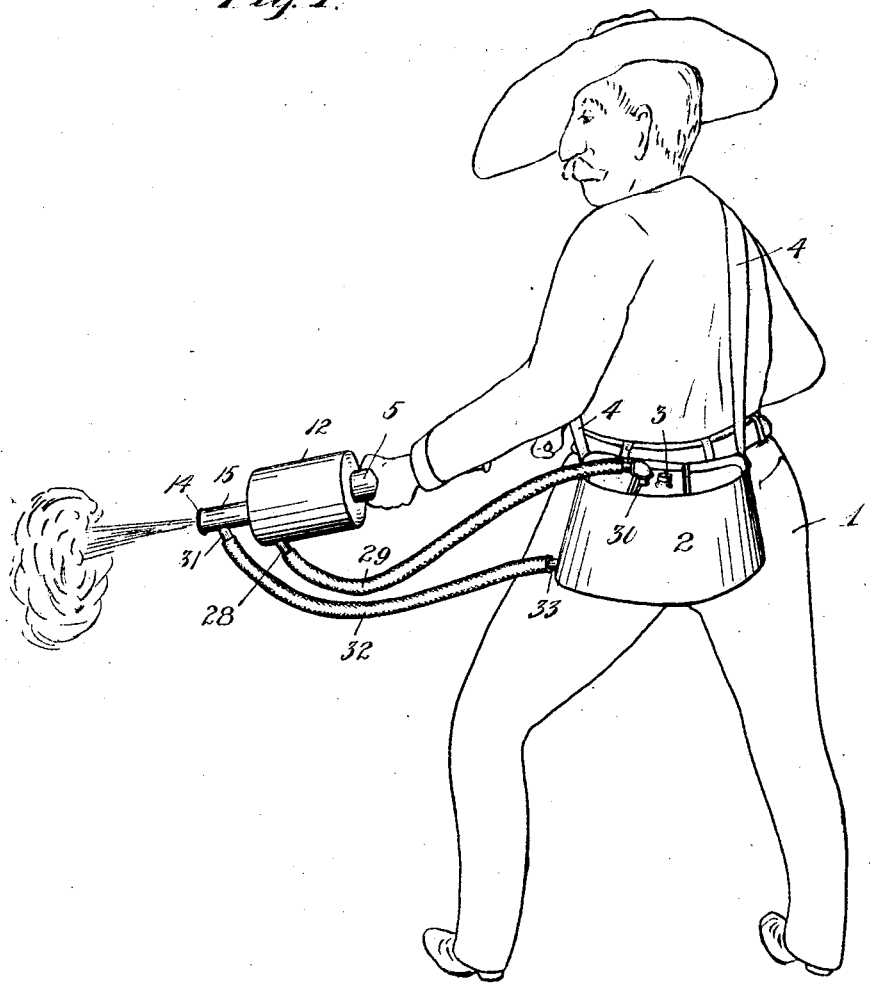

No. 803,661. PATENTED NOV. 7, 1905.
P. BRANDT.
POISON DISTRIBUTER.
APPLICATION FILED FEB. 3, 1905.

2 SHEETS—SHEET 1.

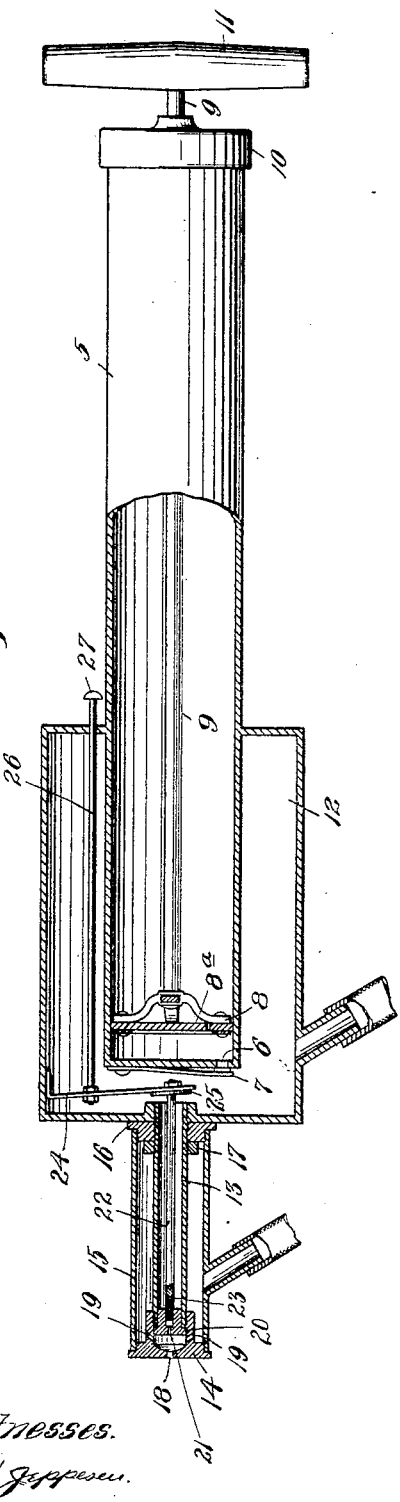

UNITED STATES PATENT OFFICE.

PETTER BRANDT, OF CHISAGO CITY, MINNESOTA.

POISON-DISTRIBUTER.

No. 803,661.	Specification of Letters Patent.	Patented Nov. 7, 1905.

Application filed February 3, 1905. Serial No. 243,930.

*To all whom it may concern:*

Be it known that I, PETTER BRANDT, a citizen of the United States, residing at Chisago City, in the county of Chisago and State of Minnesota, have invented certain new and useful Improvements in Poison-Distributers; and I do hereby declare the following to be a full, clear, and exact description of the invention, such as will enable others skilled in the art to which it appertains to make and use the same.

My invention relates to poison-distributers, and is especially designed as an improvement on the device set forth and claimed in my United States Letters Patent No. 772,454, of date October 18, 1904.

The invention consists of the novel devices and combinations of devices hereinafter described, and defined in the claim.

In the accompanying drawings, which illustrate my invention, like characters indicate like parts throughout both views.

Figure 1 is a perspective view showing my improved poison-distributer in operation, the same being applied to and operated by a man. Fig. 2 is a view, partly in plan and partly in section, showing the combined pump and sprayer.

The numeral 1 indicates the figure of a man. The numeral 2 indicates a tank, preferably of light sheet metal, which tank is adapted to contain the poisonous liquid to be sprayed upon the plants. At its top the tank 2 is formed with a removable cap 3, that closes a neck which when opened admits the poisonous liquid to be introduced into the tank. The tank is preferably carried from the shoulders, as shown in Fig. 1, and for this purpose is provided with a shoulder-strap 4.

The numeral 5 indicates the barrel of an air-pump, the same having at its discharge end an air-outlet passage 6, that is closed against an inflow of air by a check-valve 7, applied to the end of the barrel 5. Working in the barrel 5 is a piston 8, having a stem 9, which works outward through a cap 10 on the outer end of the barrel and is terminated in a handpiece 11. The stem 9 works in a head 10 in the usual way under sufficient clearance to permit quite a free flow of air into the barrel 5 under the pumping action. The intermediate portion 8ª of the piston-head 8 works as a valve which closes against the body of the said head under the working stroke, but opens under a return stroke. In other words, the two valves 7 and 8ª operate in alternate order.

Rigidly secured to and surrounding the discharge portion of the barrel 5 is an air-reservoir 12, provided at its outer end with an axially-projecting tubular stem 13, shown as secured thereto by screw-threaded engagement. A spraying-head 14 is secured by screw-threaded engagement to and around the outer end of the tubular stem 13, and a cylindrical sleeve 15, which surrounds said stem 13, is clamped with a tight joint between the projecting flange of the head 14 and the flange of a hub 16, which latter has screw-threaded engagement with the inner end of the stem 13 and is pressed against the head of the air-reservoir 12 by a lock-nut 17. The head 14 is provided with a small axial discharge-orifice 18, and the inwardly-projecting sleeve portion thereof is formed with a plurality of inlet-passages 19, that open from the water-chamber afforded by the sleeve 15.

Working in the sleeve portion of the head 14 and in the outer end of the tubular stem 13 is a slide-valve 20, having an axial discharge-orifice 21. The numeral 22 indicates a valve-stem that projects axially through the said tubular stem 13 and is secured to the valve 20. At its outer end this stem 22 is provided with a capillary passage 23, that extends axially from the outer end thereof and then diametrically through said stem, so as normally to afford communication between the interior of said tubular stem 13 and the discharge-orifice 21 of said valve 20. A spring-arm 24, which is anchored at one end to the interior of the reservoir-shell 12, is connected at its free end to the inner end of the stem 22, and to the free end of said arm is attached a valve 25, which when moved is adapted to close the inner end of the tubular stem 13. The tension of said spring-arm 24 normally holds the two valves 20 and 25 in open positions, as shown in Fig. 2. An operating-rod 26 is attached at one end to the intermediate portion of the spring-arm 24, and its outer end extends through the inner end of the air-reservoir 12 and terminates in a head 27. By pressing on the head 27 the spring-arm 24 may be moved, so as to cause the air-cut-off valve 25 to close the inner end of the tubular stem 13 and simultaneously move the valve 20, so as to close the water-passages 19 of the spraying-head 14. This affords means for quickly cutting off and turning on the spray.

The air-chamber 12 has a nipple 28, which is connected by a flexible tube 29 to a nipple 30, that opens into the upper portion of the tank 2. The water-chamber within the sleeve 15 has a nipple 31, that is connected by a flexible tube 32 to a nipple 33, that projects from the lower portion of the tank 2.

With the above-described construction it is evident that when air-pressure is produced in the air-reservoir 12 by the operation of the pump a portion thereof will be discharged through the hollow stem 13, through the air-passages 21 and 23 of the valve 20 and stem 22, respectively, and through the discharge-orifice 18 of the spraying-head 14. Also a portion of the air will be driven into the upper portion of the tank 2, and the pressure exerted thereby will force a stream of water to flow through the water-tube 32 into the water-chamber 15, thence through the water-passages 19 into the small chamber of the spraying-cap 14, where it becomes subject to the fine spray of air and is carried therewith in the form of a spray out through the discharge-orifice 18 of said spraying-cap.

The device above described has been constructed and put into use and has been found extremely efficient for the purposes had in view.

What I claim, and desire to secure by Letters Patent of the United States, is as follows:

In a spraying device, the combination with a liquid-containing tank, of an air-reservoir and a water-chamber, rigidly attached the one to the other, and in communication with said tank, a tubular air-delivery stem leading outward from said air-reservoir through said water-chamber, a spraying-head closing the outer ends of said water-chamber and of said delivery-stem, and having a discharge-orifice, and in communication with the interior of said water-chamber, a slide-valve working in said spraying-head and having an air-passage opening into said delivery-stem, a valve-stem extending from said valve into said air-reservoir, said water-chamber, air-passage and valve-stem concentrically arranged and said valve-stem having at its inner extremity a second valve for closing said air-delivery stem, a spring-arm connected to said valve-stem, and an operating-rod extending from said spring-arm to the exterior of the device, substantially as described.

In testimony whereof I affix my signature in presence of two witnesses.

PETTER BRANDT.

Witnesses:
CHARLES A. WALLMARK,
DAVID BRANDT.